US007448237B2

(12) United States Patent
Shimada et al.

(10) Patent No.: US 7,448,237 B2

(45) Date of Patent: Nov. 11, 2008

(54) ROTATIONAL ELEMENT POSITION DETECTOR FOR DOOR LATCH ASSEMBLY

(75) Inventors: Junichi Shimada, Kanagawa (JP); Shingo Gotou, Kanagawa (JP); Hirotsugu Takai, Kanagawa (JP); Takasi Ogawa, Kanagawa (JP)

(73) Assignee: Ohi Seisakusho Co., Ltd., Yokohama-shi (JP)

( * ) Notice: Subject to any disclaimer, the term of this patent is extended or adjusted under 35 U.S.C. 154(b) by 347 days.

(21) Appl. No.: 11/216,072

(22) Filed: Sep. 1, 2005

(65) Prior Publication Data

US 2006/0108811 A1 May 25, 2006

(30) Foreign Application Priority Data

Sep. 2, 2004 (JP) ............................ 2004-255824

(51) Int. Cl.
*B60R 25/00* (2006.01)

(52) U.S. Cl. .......................... 70/237; 70/264; 70/278.2; 70/279.1; 70/190; 292/201; 292/216

(58) Field of Classification Search ................... 70/237, 70/264, 278.2, 279.1, 190; 292/201, 216
See application file for complete search history.

(56) References Cited

U.S. PATENT DOCUMENTS

| | | | | |
|---|---|---|---|---|
| 5,603,539 | A * | 2/1997 | Gruhn et al. | 292/216 |
| 6,007,117 | A * | 12/1999 | Spindler | 292/199 |
| 6,655,179 | B2 * | 12/2003 | Kobayashi et al. | 70/237 |
| 6,679,532 | B2 * | 1/2004 | Inoue | 292/216 |
| 6,698,300 | B2 * | 3/2004 | Swan | 74/89.18 |
| 6,719,333 | B2 * | 4/2004 | Rice et al. | 292/216 |
| 6,938,446 | B2 * | 9/2005 | Fukunaga et al. | 70/237 |
| 7,213,428 | B2 * | 5/2007 | Harada et al. | 70/256 |
| 2002/0074808 | A1 * | 6/2002 | Inoue | 292/216 |
| 2007/0090654 | A1 * | 4/2007 | Eaton | 292/201 |

FOREIGN PATENT DOCUMENTS

JP 2002-339625 A 11/2002

* cited by examiner

*Primary Examiner*—Suzanne D Barrett
(74) *Attorney, Agent, or Firm*—Foley & Lardner LLP

(57) ABSTRACT

To prevent an erroneous installation of a rotational detection lever and a rotational element, one of a plurality of toothed portions of a rotational element is made into a larger toothed portion which is larger in pitch and/or tooth height, and one of a plurality of tooth grooves of a rotation detection lever is made into a larger tooth groove which can mesh with the larger toothed portion when the rotational element and the rotation detection lever are positioned so as to correspond to each other.

8 Claims, 8 Drawing Sheets

ROTATIONAL ELEMENT POSITION DETECTOR FOR DOOR LATCH ASSEMBLY

This application is based on Japanese Patent Application No. 2004-255824, which is incorporated herein by reference.

BACKGROUND OF THE INVENTION

1. Field of the Invention

The present invention relates to a rotational element position detector for an automotive door latch assembly in which a rotational position of the rotational element can be detected by means of an electric switch.

2. Description of the Related Art

In automotive door latch assemblies, there exists a rotational element position detector in which a plurality of toothed portions are provided on an outer circumference of a rotational element (a latch) that is rotatably supported on a housing and a plurality of toothed portion which are capable of meshing with the toothed portions of the rotational element are provided on a rotation detection lever (a sector member) of an electric switch mounted on the housing, so that the rotation detection lever of the electric switch is made to rotate while following the rotation of the rotational element, whereby a rotational position of the rotational element is detected based on the rotational position of the rotation detection lever (for example, refer to JP-A-2002-339625).

In the related art rotational element position detector that has been described just above, however, in installing the rotational element and the electric switch in the housing, there may occur an erroneous installation in which the toothed portions of the rotational element and the electric switch are made to mesh with each other while the rotational element and the electric switch are positioned so as not to correspond to each other. In case such an erroneous installation occurs, the detecting position of the rotation detection lever which follows the rotating rotational element is caused to deviate from the normal position, and hence the rotational position of the rotational element cannot be detected accurately.

SUMMARY OF THE INVENTION

The invention was made in view of the aforesaid problem inherent in the related art and an object thereof is to provide a rotational element position detector for a door latch assembly which is designed to prevent the erroneous installation of the rotation detection lever and the rotational element.

According to the invention, the problem is solved as follows.

(1) According to a first aspect of the invention, there is provided a rotational element position detector for a door latch assembly comprising a plurality of toothed portions provided on a rotational element being capable of moving between two different positions, and a plurality of toothed portions provided on a rotation detection lever of an electric switch, wherein one of the plurality of toothed portions of either of the rotational element and the rotation detection lever is made into a larger toothed portion which is larger in at least one of pitch or tooth height than the other toothed portions, and wherein one of a plurality of tooth grooves of the other of the rotational element and the rotation detection lever is made into a larger tooth groove that can be brought into mesh engagement with the larger toothed portion when the rotational element and the rotation detection lever are positioned so as to correspond to each other. Incidentally, the plurality of toothed portions provided on the rotational element and the plurality of toothed portions provided on the rotation detection lever are made to mesh with each other, so that the rotation detection lever is made to rotate while following the rotation of the rotational element, whereby a rotational position of the rotational element can be detected.

(2) According to a second aspect of the invention, there is provided a rotational element position detector for a door latch assembly as set forth under (1), wherein in installing the rotational element and the rotation detection lever, the larger toothed portion and the larger tooth groove are made capable of meshing with each other when the rotational element is situated at one of the two positions and the rotation detection lever is situated at a position which corresponds to the one of the two positions being taken by the rotational element.

(3) According to a third aspect of the invention, there is provided a rotational element position detector for a door latch assembly as set forth in (1) or (2), wherein the rotational element is made to constitute a key lever that is capable of rotating to two positions of a locking position and an unlocking position in synchronism with the operation of a key cylinder provided on an exterior side of a door.

According to the invention, the following advantages are provided.

(a) According to the first aspect of the invention, by making one of the plurality of toothed portions of either of the rotational element and the rotation detection lever into the larger toothed portion which is larger in at least one of pitch or tooth height than the other toothed portions and making one of the plurality of tooth grooves of the other of the rotational element and the rotation detection lever into a larger tooth groove that can be brought into mesh engagement with the larger toothed portion when the rotational element and the rotation detection lever are positioned so as to correspond to each other, the erroneous installation can be prevented, and it is ensured that the rotation detection lever can rotate to the rotational position which corresponds to the rotational position of the rotational element, thereby making it possible to detect the rotational position of the rotational element with accuracy.

(b) According to the second aspect of the invention, the installation of the rotational element and the rotation detection lever can be implemented in an easy and ensured fashion.

(c) According to the third aspect of the invention, the locking and unlocking positions of the key lever can be detected in an ensured fashion.

DETAILED DESCRIPTION OF THE PREFERRED EMBODIMENTS

Figure 1:
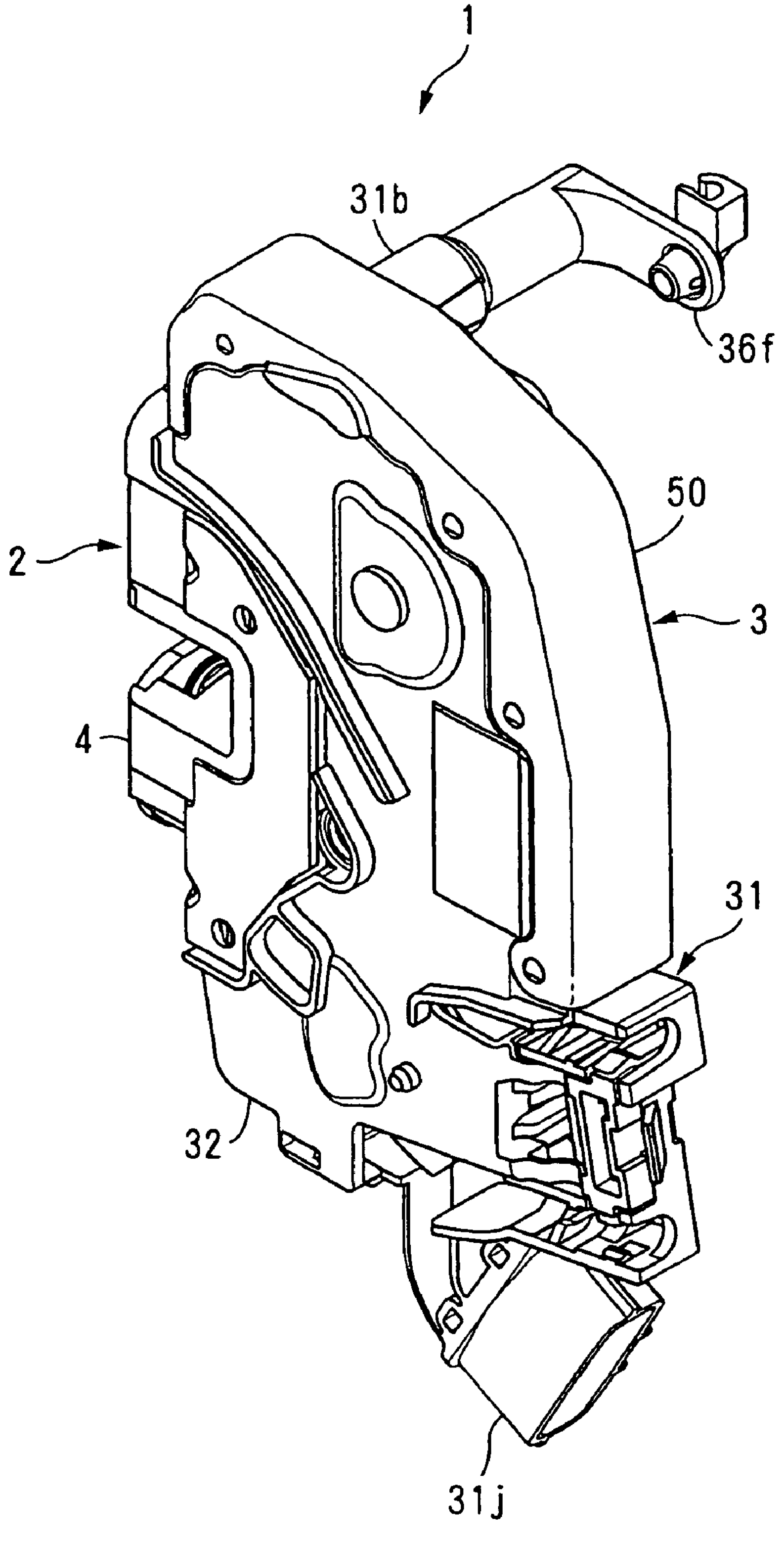
FIG. 1 is an external perspective view of a door latch assembly according to the invention.
Figure 2:
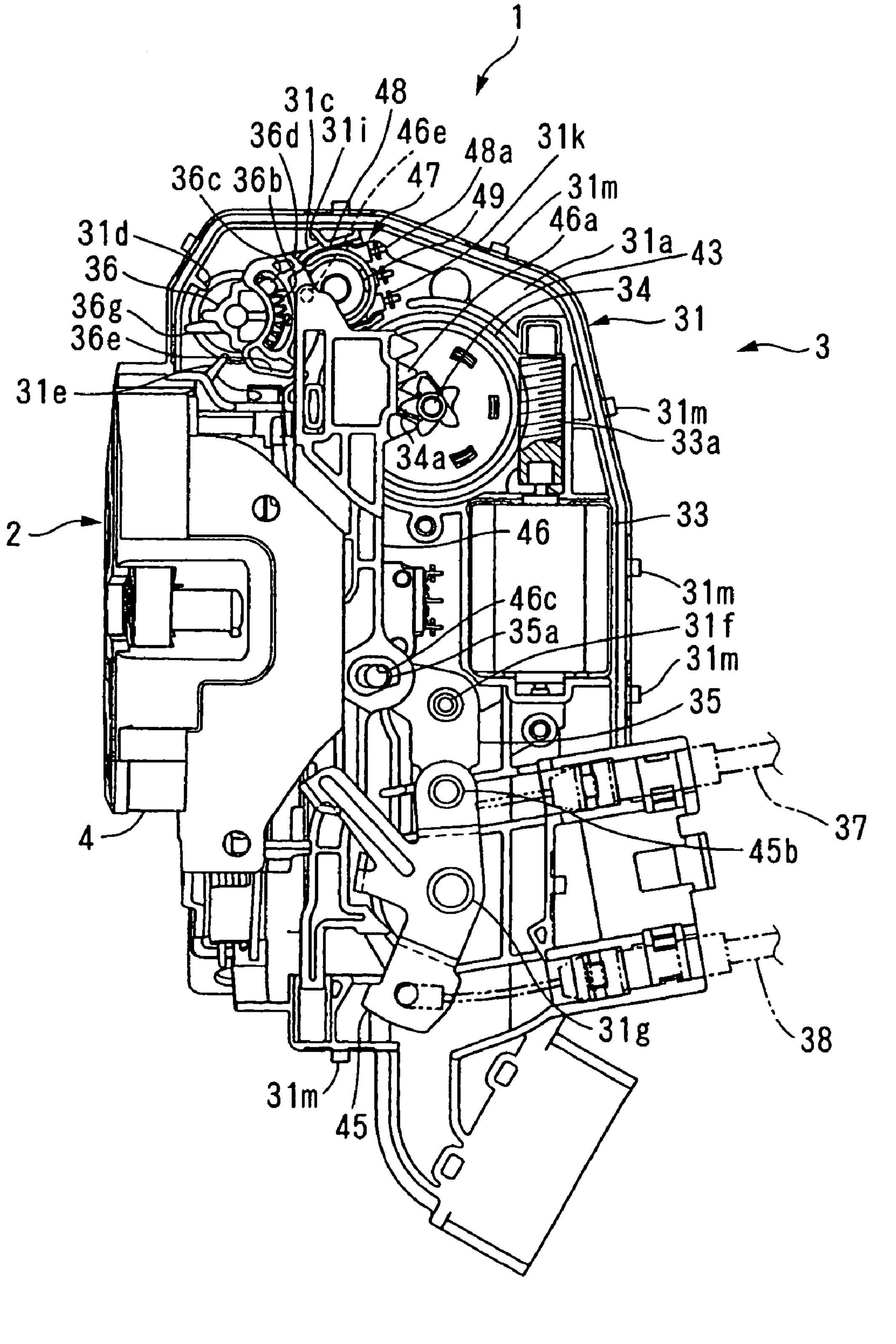
FIG. 2 is a left side view of the door latch assembly with a cover thereof removed.
Figure 3:
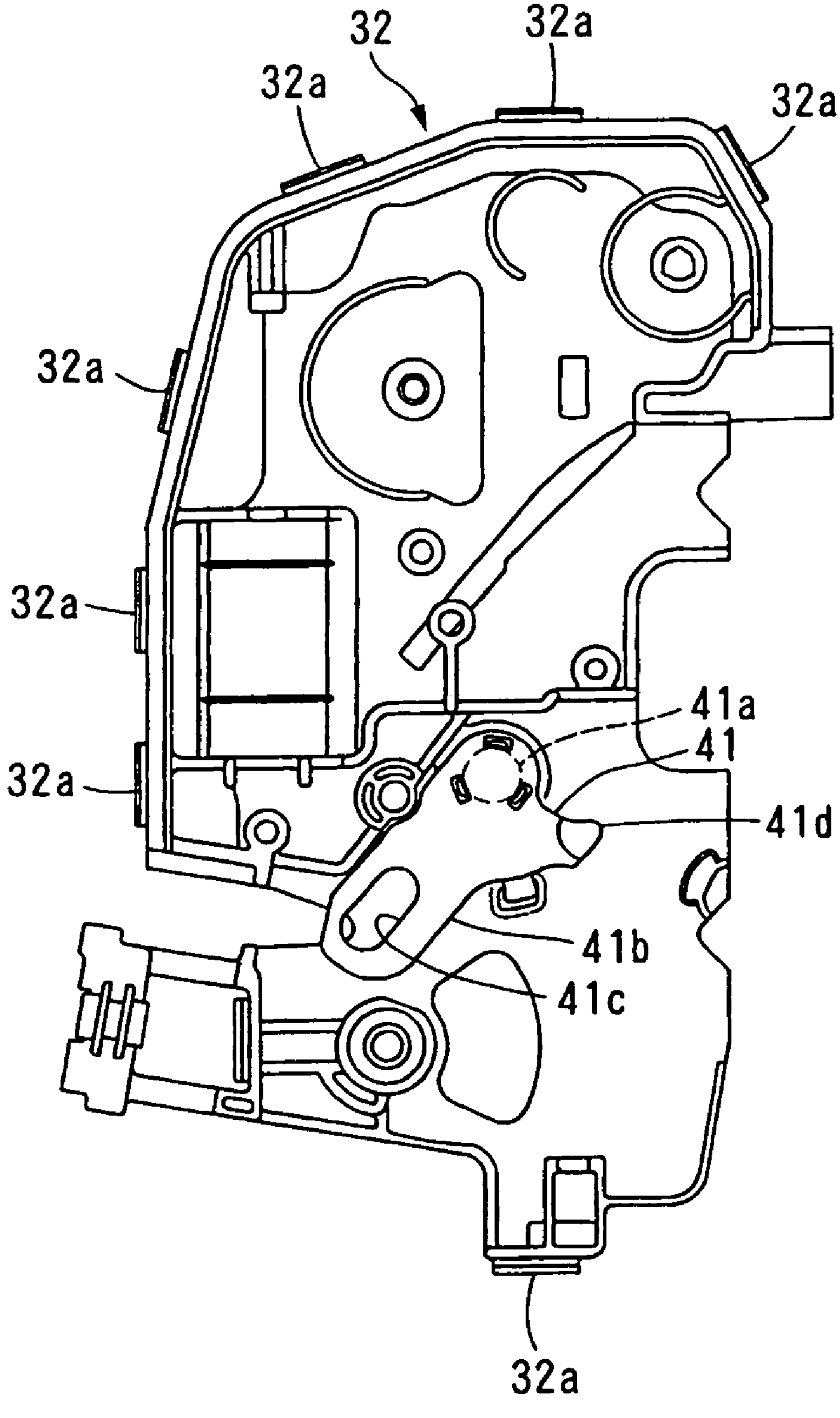
FIG. 3 is a right side view of the cover.
Figure 4:
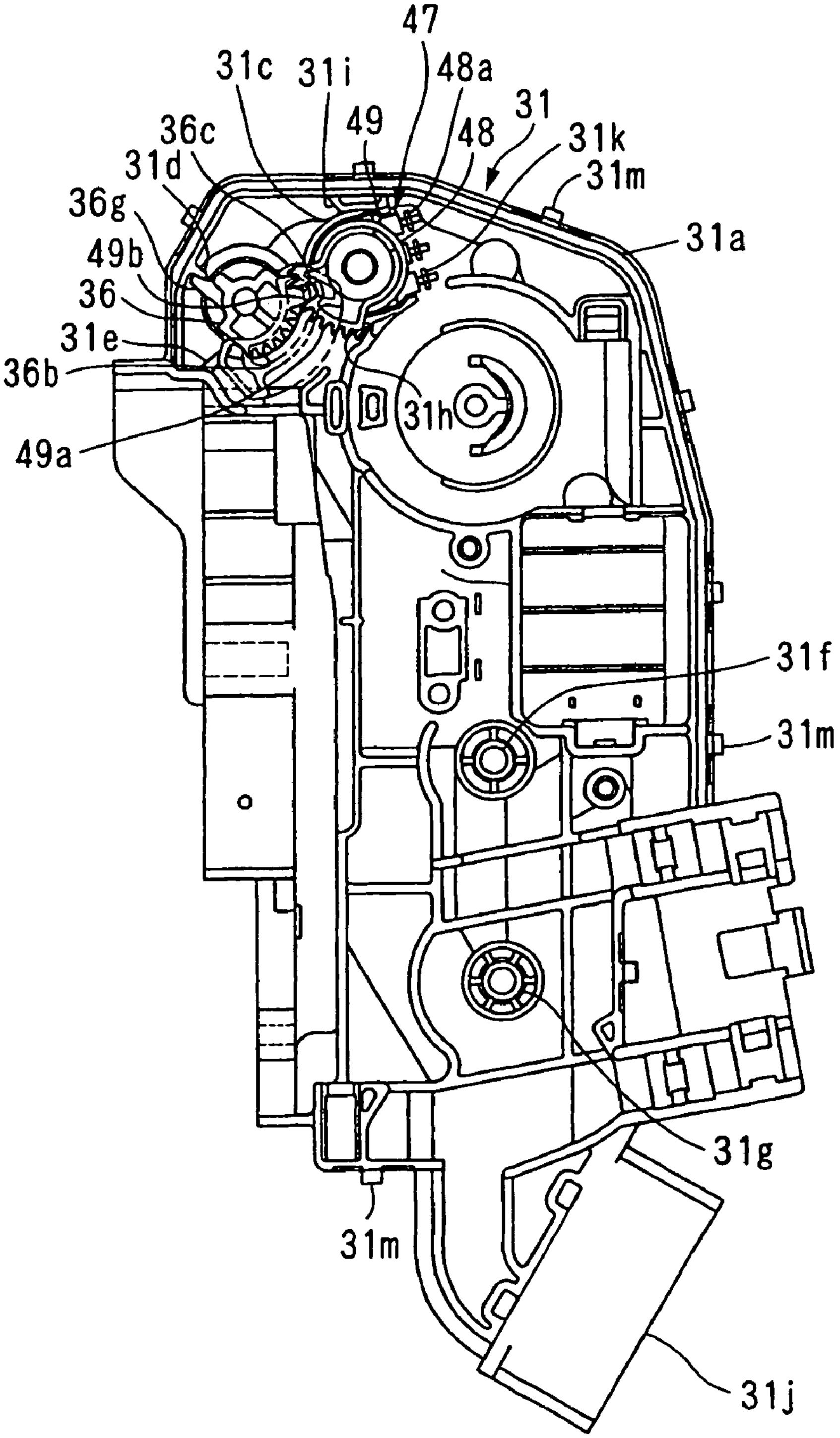
FIG. 4 is a left side view of a housing.

Hereinafter, an embodiment of the invention will be described based on the drawings. FIG. 1 is an external perspective view of a door latch assembly to which the invention is applied, FIG. 2 is a left side view of the door latch assembly with a cover removed, FIG. 3 is a right side view of a case, and FIG. 4 is a left side view of a housing. Note that in the following description, the front of the latch assembly is diagonally to the lower left of FIG. 1, is to the right of FIGS. 2 and 4 and is to the left of FIG. 3, whereas the rear thereof is diagonally to the upper right of FIG. 1, is to the left of FIGS. 2 and 4, and is to the right of FIG. 3.

A door latch assembly (1) is configured so as to include a meshing structure (2) that is fixed to an interior rear end portion of an automotive front side door (hereinafter, referred to as a door) by a plurality of bolts (not shown) and an operation structure (3) which controls the meshing structure (2).

The meshing structure (2) includes a box-like body (4) made of a synthetic resin, and this body (4) accommodates a meshing means (not shown) which keeps a door closed by being brought into engagement with a striker (not shown) that is secured to the side of a vehicle body. In addition, a locking and unlocking means (not shown) is provided on a front side of the body (4) which is adapted to be operated, through the operation of a door opening operation handle provided on an external side of the door, between an unlocking position where the engagement between the meshing means and the striker is released so as for the door to be opened and a locking position where the engagement is disabled so as for the door not to be opened.

Note that since the meshing means is such as to have a known configuration and has a latch (not shown) adapted to be brought into engagement with and disengagement from the striker and a locking plate (not shown) adapted to be brought into engagement with the latch so as to maintain an engaged state resulting between the latch and the striker and the meshing means so configured does not directly relate to the invention, a detailed description of the meshing means is omitted here.

The operation structure (3) is fixed to a front side of the meshing structure (2) and includes a synthetic resin housing (31) and a synthetic resin cover (32) which is fixed to a left side of the housing (31) so as to close a components accommodating portion (31*a*) of the housing (31). As shown in FIG. 2, there are accommodated in the components accommodating portion (31*a*) a motor (33), a wormwheel (34), a knob lever (35), a key lever (36) which constitutes a rotational element, an inside lever (45), a transfer lever (46) and a rotary switch (47) which constitutes an electric switch. In addition, an override lever (41), which is shown in FIG. 3, is rotatably supported on the cover (32). A synthetic top cover (50) for preventing the ingress of rain water into the housing (31) and the components accommodating portion (32*a*) is provided on upper and front sides of the housing (31) and the cover (32).

Three terminals (31*k*) of a conductive plate (not shown) are molded integrally on the housing (31) through insert molding which electrically connect terminals of a connector portion (31*j*), which is provided at a lower end portion of the housing (31) and is to be electrically connected to an external electric control circuit unit (not shown), to the rotary switch (47).

The cover (32) has, as mainly shown in FIG. 3, a plurality of engagement pieces (32*a*) on an outer circumference thereof, and these engagement pieces (32*a*) are brought into engagement with a plurality of projections (31*m*) provided on an outer circumference of the housing (31), whereby the cover (32) is fixed to the housing (31) in such a manner as to close the components accommodating portion (31*a*).

The transfer lever (46) is supported in such a manner as to slide vertically into the components accommodating portion (31*a*) of the housing (31), and a connection hole (46*b*) (refer to FIGS. 8, 9) provided relatively close to an upper portion of the transfer lever (46) is connected to the locking and unlocking means. In addition, a toothed portion (46*a*) provided at the upper portion of the transfer lever (46) meshes with a toothed portion (34*a*) provided on the worm wheel (34), and furthermore, a connection hole (46*c*) provided at a central portion of the transfer lever (46) is connected to an end portion (35*a*) of the knob lever (35).

The knob lever (35) is supported rotatably on a shaft portion (31*f*) provided in the components accommodating portion (31*a*) of the housing (31) and is connected via a cable (37) to a lock knob (not shown) that is provided on an internal side of the door to perform locking and unlocking actions, whereby the knob lever (35) is allowed to move via the transfer lever (46) based on the operation of the lock knob to a locking position (refer to FIGS. 2, 8) where the locking and unlocking means is operated to be at the locking position and an unlocking position (refer to FIG. 9) which is substantially 45 degrees apart in a counterclockwise direction from the locking position and where the locking and unlocking means is operated to be at the unlocking position.

The motor (33) is controlled to rotate in predetermined directions based on operation of a remote control switch or the like (not shown) and is fixed in place in the components accommodating portion (31*a*) of the housing (31). A worm (33*a*) fixed to an output shaft thereof meshes with the worm wheel (34) which is supported rotatably by a pivot shaft (43) in the components accommodating portion (31*a*). Note that electric terminals of the motor (33) are connected to terminals of the conductive plate which is insert molded in the housing (31).

Figure 8:
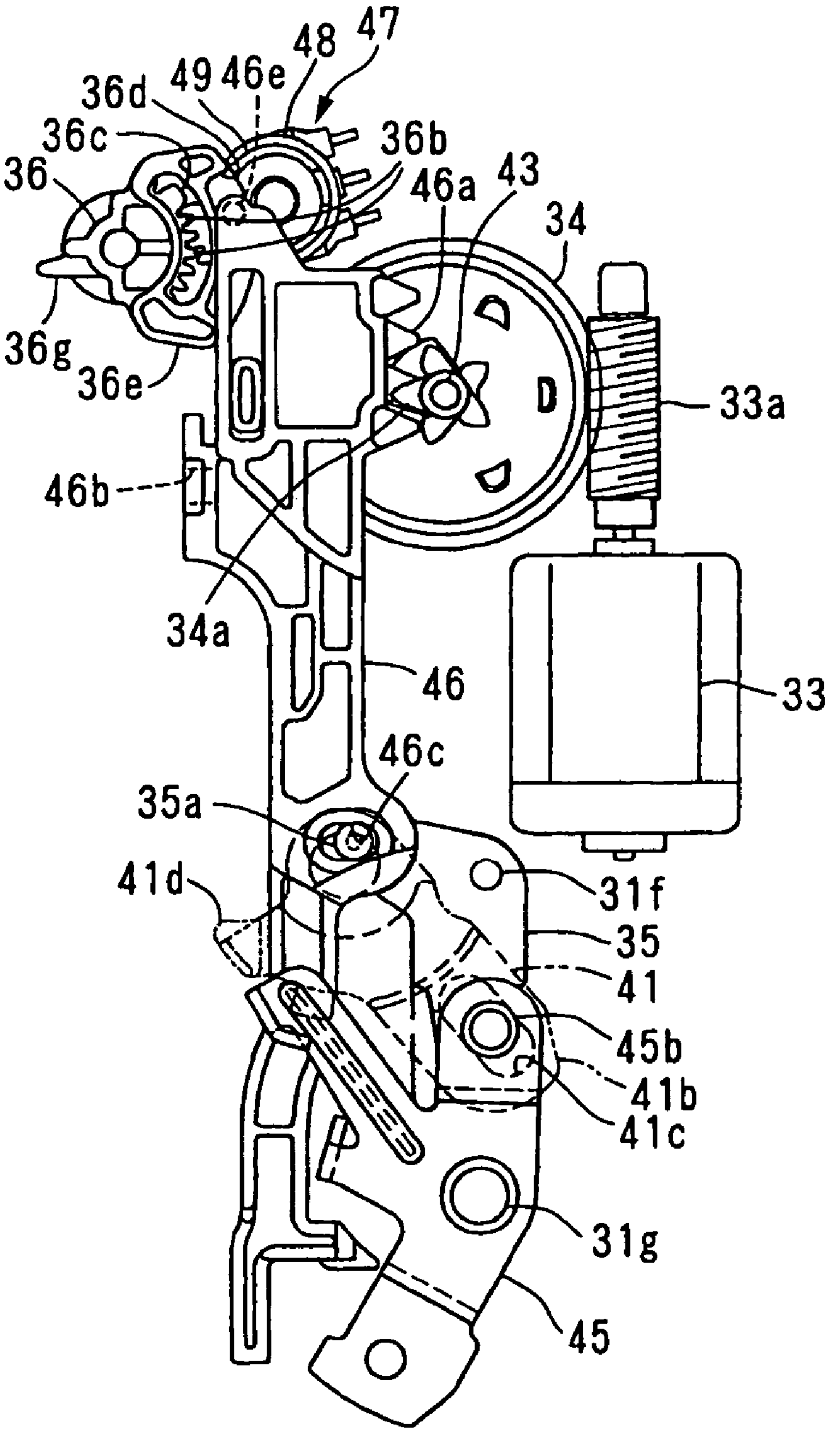
FIG. 8 is a left side view of the main portion which is situated at a locking position.
Figure 9:
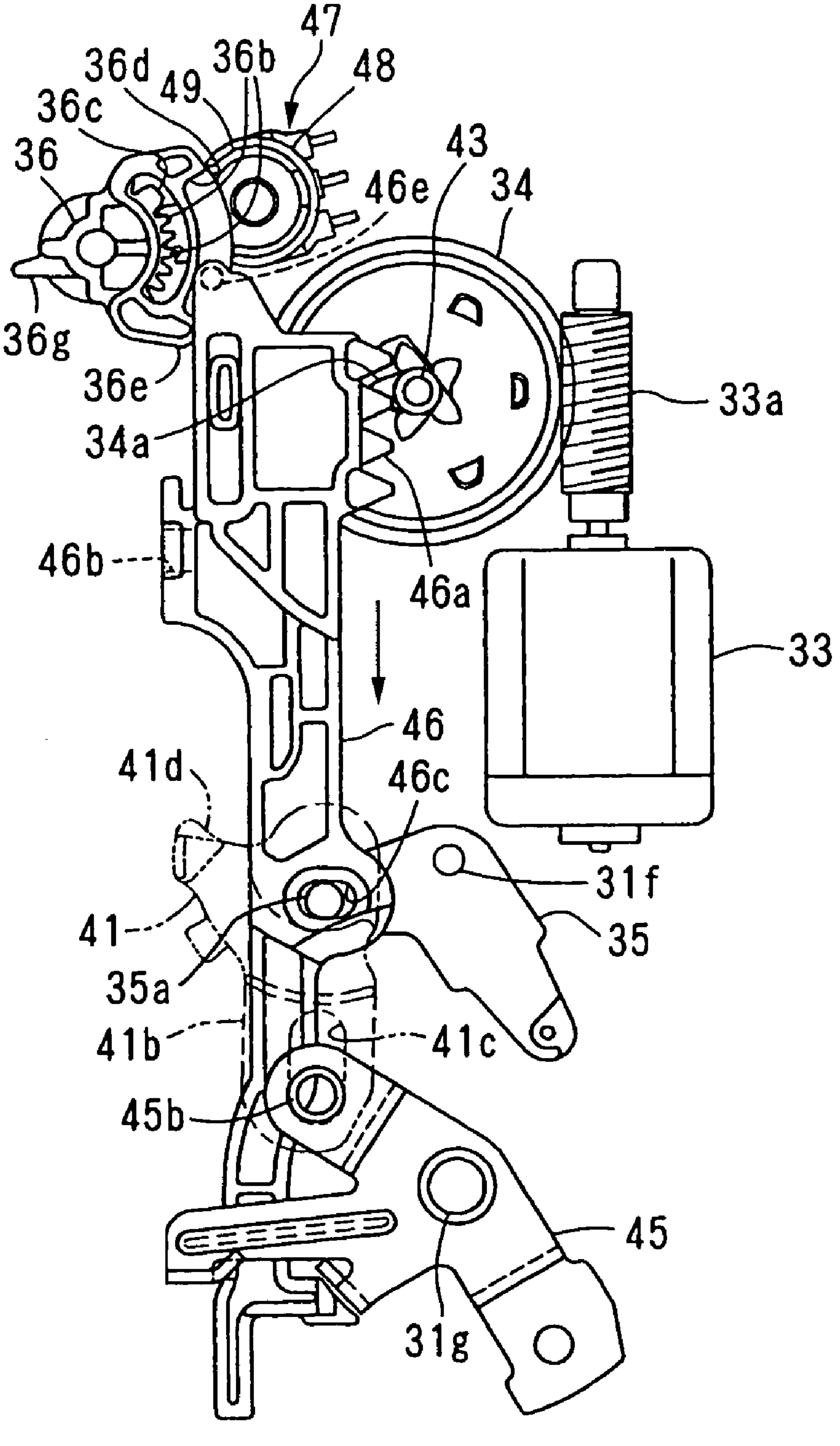
FIG. 9 is a left side view of the main portion which is at an unlocking position.

When the worm wheel (34) is caused to rotate in the counterclockwise direction in FIGS. 2, 8 by virtue of rotation of the motor (33), the locking and unlocking means is operated to move from the locking position to the unlocking position via the transfer lever (46), whereas when the worm wheel (34) is caused to rotate in a clockwise direction in FIG. 9, the locking and unlocking means is operated to move from the unlocking position to the locking position via the transfer lever (46).

The inside lever (45) is supported rotatably on a shaft portion (31*g*) provided in the components accommodating portion (31*a*) of the housing (31) and is connected to an operation handle (not shown) provided on the internal side of the door via a cable (38), whereby the inside lever (45) rotates from a position shown in FIGS. 2, 8 to a release position shown in FIG. 9 based on a door opening operation by the operation handle.

The override lever (41) that is rotatably supported on an internal surface of the cover (32) by a shaft portion (41*a*) is disposed in such a manner as to be superposed on the transfer lever (46) and the knob lever (35) when the cover (32) is fixed to the housing, and a projection (45*b*) provided on the inside lever (45) is brought into engagement with an elongated hole (41*c*) provided in an arm portion (41*b*).

In the configuration that has been described heretofore, when the inside lever (45) rotates from the waiting position (refer to FIGS. 2, 8) to the release position (refer to FIG. 9) based on a door opening operation by the operation handle inside a passenger compartment, the override lever (41) rotates to the release position (refer to FIG. 9) in synchronism with the rotation of the inside lever (45), and an operating portion (41*d*) of the override lever (41) is brought into abutment with a release lever (not shown) of the meshing means so as to cause the release lever to perform a releasing operation, whereby the engaged state of the meshing means can be released from the passenger compartment's side irrespective of the position of the locking and unlocking means.

Figure 5:
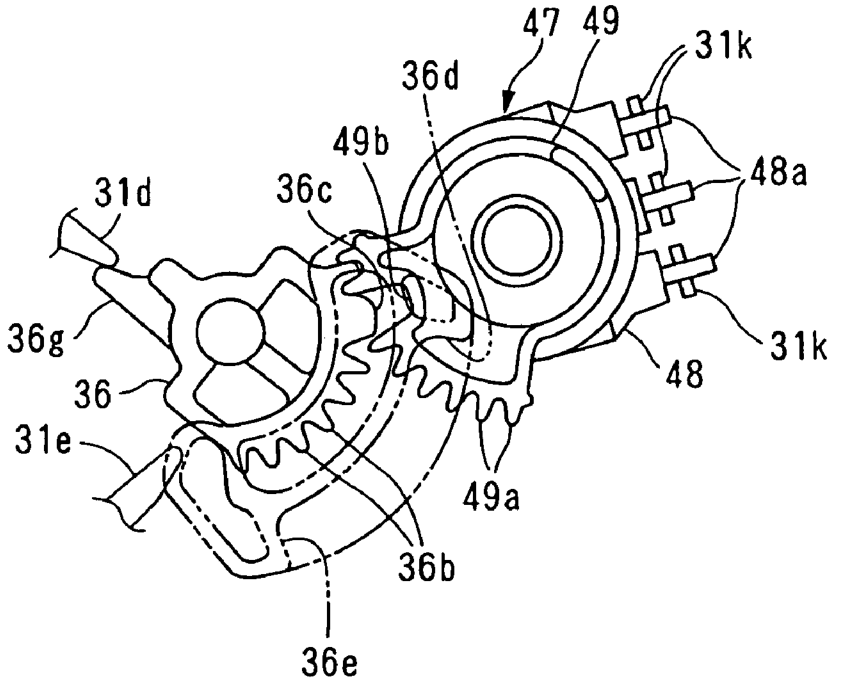
FIG. 5 is an enlarged left side view of a main portion of the latch assembly.
Figure 6:
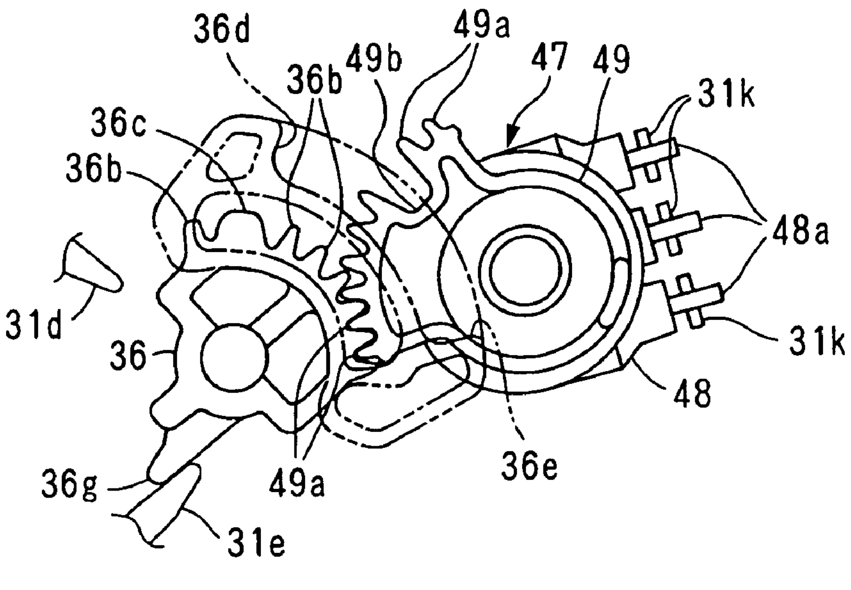
FIG. 6 is an enlarged left side of the main portion.
Figure 7:
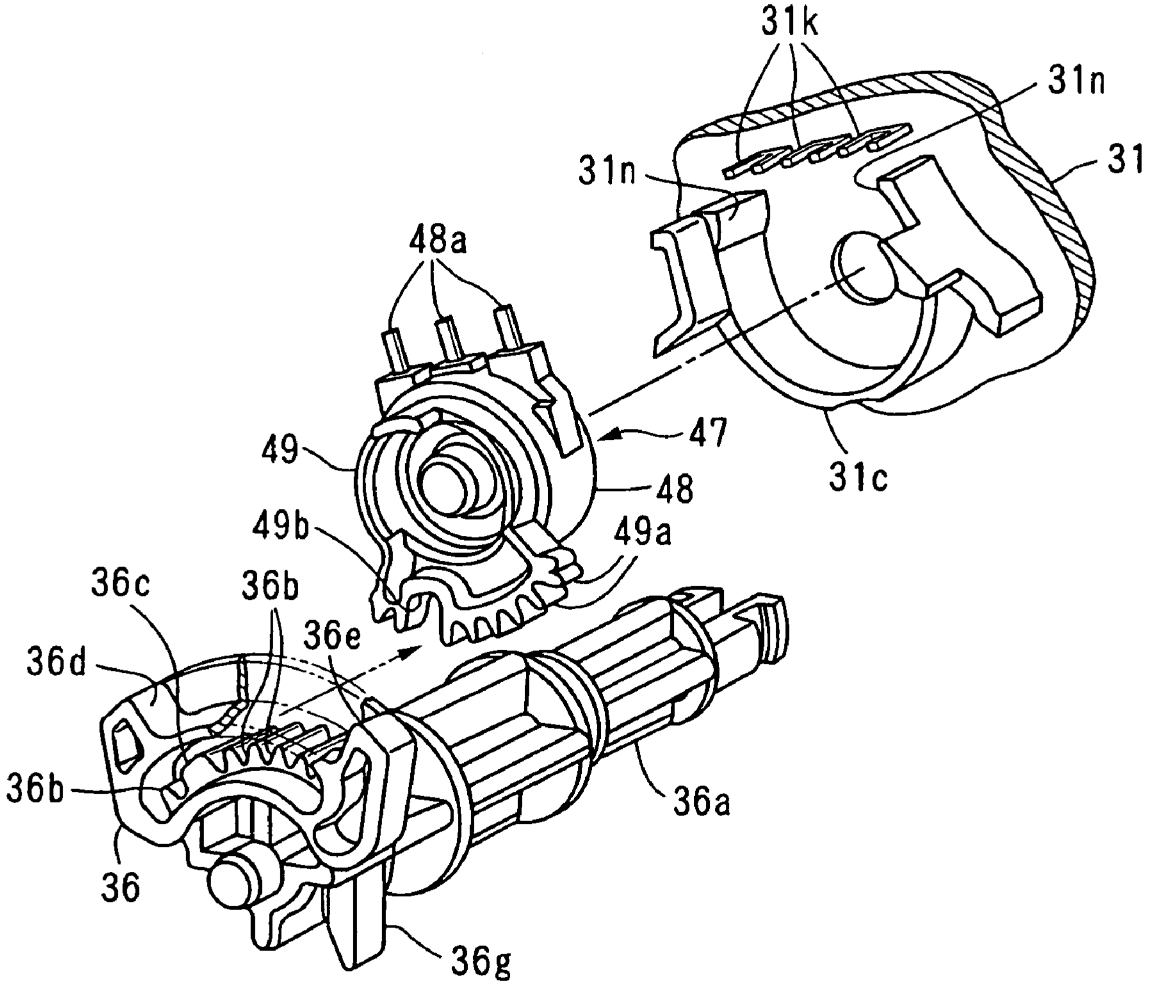
FIG. 7 is an enlarged exploded perspective view of the main portion.

The key lever (36) is rotatably supported by a shaft portion (36*a*) which faces forward (refer to FIG. 7) in a cylindrical key lever accommodating portion (31*b*) (refer to FIG. 1) provided at the upper portion of the housing (31), and a plurality of toothed portions (36*b*) are provided on an outer circumference of the key lever (36) so as to restrict a range of rotation of the key lever (36) between an unlocking position where an arm portion (36*g*) which protrudes rearward is brought into abutment with a first stopper portion (31*d*) provided on the housing (31) as shown in FIGS. 4, 5 and a locking position where the arm portion (36*g*) is brought into abutment with a second stopper portion (31*e*) provided below the first stopper portion (31*d*) as shown in FIG. 6. Note that the top of FIG. 7 denotes the front of the door latch assembly (1) and the bottom thereof denotes the rear of the same latch assembly.

Among the plurality of toothed portions (36*b*) provided on the key lever (36), the toothed portion situated just before the toothed portion (36*b*) situated at a most distal end in the counterclockwise direction is made into a larger toothed portion (36*c*) which is larger in pitch and/or tooth height than the other toothed portions (36*b*).

A connection lever (36*f*) is secured to a portion which protrudes outwards from the key lever accommodating portion (31*b*) of the key lever (36) in such a manner as to permit any movement thereof which is to be connected to a key cylinder (not shown) provided on the external side of the door, whereby when the key lever (36) rotates clockwise from a neutral position (a position where the arm portion (36*g*) is positioned between the first stopper portion (31*d*) and the second stopper portion (31*e*)) shown in FIG. 2, an upper claw-like portion (36*d*) provided on the key lever (36) is brought into abutment with a projection (46*e*) provided at the upper portion of the transfer lever (46) from above so as to move down the transfer lever (46), so that the locking and unlocking means is operated to be at the unlocking position. In addition, when the key lever (36) moves counterclockwise from the same neutral position, a lower claw-like portion (36*e*) is brought into abutment with the projection (46*e*) from below so as to move up the transfer lever (46), so that the locking and unlocking means is operated to be at the locking position.

The rotary switch (47) has a case (48) which is fitted to be fixed in place in a switch accommodating portion (31*c*) provided at an upper portion of the components accommodating portion (31*a*) and a rotation detection lever (49) supported by a shaft portion (not shown) on the case (48) in such a manner as to freely rotate, and a plurality of toothed portions (49*a*) are provided on an outer circumference of the rotation detection lever (49) in such a manner as to be brought into mesh engagement with the toothed portions (36*b*) of the key lever (36).

A larger root or tooth groove (49*b*) is provided between, among the plurality of toothed portions (49*a*), the second toothed portion (49*a*) and the third toothed portion (49*a*) from the toothed portion (49*a*) situated at a most distal end in the clockwise direction which is larger than tooth grooves between the other toothed portions (49*a*) This larger tooth groove (49*b*) is allowed to mesh with only the larger toothed portion (36*c*) of the key lever (36) when the key lever (36) and the rotation detection lever (49) are located at positions where they face each other, for example, when the key lever (36) and the rotation detection lever (49) are both located at the unlocking positions. Namely, within the respective operation ranges of the key lever (36) and the rotation detection lever (49), the larger toothed portion (36*c*) and the larger tooth groove (49*b*) are designed to mesh with each other only at the proper positions but to lap on each other at the other positions so as to disable the normal meshing engagement.

The rotation detection lever (49) is designed to follow the rotation of the key lever (36) through mesh engagement of the toothed portion (49*a*) with the toothed portion (36*b*) of the key lever (36) so as to rotate between a position where the rotation detection lever (49) is brought into abutment with a third stopper portion (31*h*) provided in the components accommodating portion (31*a*), that is, an unlocking position which corresponds to the unlocking position of the key lever (36) and a position where the rotation detection lever (49) is brought into abutment with a fourth stopper portion (31*i*) provided above the third stopper portion (31*h*) or a position which is slightly before the position where the butment occurs, that is, a locking position which corresponds to the locking position of the key lever (36).

The rotary switch (47) is fixed in the switch accommodating portion (31*c*), whereby electric terminals (48*a*) protruding from the case (48) are electrically connected to the terminals (31*k*) on the side of the connector portion (31*j*), so that when the rotation detection lever (49) rotates to the locking position and the unlocking position, locking and unlocking signals are designed to be outputted from the terminals of the connector portion (31*j*) to an electric control circuit unit.

When installing the key lever (36) and the rotary switch (47), first of all, the case (48) is brought into engagement with a positioning portion (31*n*) provided in the switch accommodating portion (31*c*) so as to be positioned and fixed in place, and the rotation detection lever (49) is held at the unlocking position shown in FIGS. 4, 5. Next, the shaft portion (36*a*) is rotatably supported in the key lever accommodating portion (31*b*) in such a state that the key lever (36) is at the unlocking position, and the large toothed portion (36*c*) of the key lever (36) is made to mesh with the larger tooth groove (49*b*) of the rotation detection lever (49), whereby since the respective toothed portions (36*b*) (49*a*) are brought into mesh engagement with each other while the key lever (36) and the rotation detection lever (49) are located at the positions where they correspond to each other, the rotation detection lever (49) rotates to an accurate position while following the rotation of the key lever (36) so as to detect the rotational position of the key lever (36) in an ensured fashion.

In addition, when attempting to rotatably support the key lever (36) in the key lever accommodating portion (31*b*) in such a state that either the key lever (36) or the rotation detection lever (49) deviates from the unlocking position, since the relative positional relationship between the larger toothed portion (36*c*) and the larger tooth groove (49*b*) deviates, the respective toothed portions (36*b*) (49*a*) of the key lever (36) and the rotation detection lever (49) are not allowed to mesh with each other. Consequently, since the installation cannot be implemented at other positions than the position where the key lever (36) and the rotation detection lever (49) correspond to each other, the occurrence of an erroneous installation can be prevented.

Note that while the invention has been described with respect to the embodiment thereof, various modifications and alterations can be made to the embodiment as below without departing from the spirit and scope of the invention.

(i) The rotational element is made up of the knob lever (35), the inside lever (45) or the latch of the meshing means, in place of the key lever (36).

(ii) The larger toothed portion (36*c*) is provided on the rotation detection lever (49), while the larger tooth groove (49*b*) is provided on the key lever (36).

(iii) The larger toothed portion (36*c*) and the larger tooth groove (49*b*) are provided at other positions than those described in the embodiment.

Thus, according to the invention, there is provided the rotational element (36) position detector for a door latch assembly (1) in which the plurality of toothed portions (36*b*) provided on the rotational element (the key lever) (36) that is capable of moving between the two different positions (the unlocking position and the locking position) and a plurality of toothed portions (49*a*) provided on the rotation detection lever (49) of the electric switch (the rotary switch) (47) are made to mesh with each other, so that the rotation detection lever (49) is made to rotate while following the rotation of the rotational element (36), whereby a rotational position of the rotational element (36) can be detected, wherein one of the plurality of toothed portions (36*b*) (49*a*) of either of the rotational element (36) and the rotation detection lever (49) is made into a larger toothed portion (36*c*) which is larger in pitch and/or tooth height than the other toothed portions, and one of a plurality of tooth grooves of the other of the rotational element (36) and the rotation detection lever (49) is made into a larger tooth groove (49*b*) that can be brought into mesh engagement with the larger toothed portion (36*c*) when the rotational element (36) and the rotation detection lever (49) are positioned so as to correspond to each other (for example, when the rotational element (36) and the rotation detection lever (49) are both positioned at the unlocking positions). According to this configuration, it is ensured that the rotation detection lever (49) can rotate to the rotational position which corresponds to the rotational position of the rotational element (36), thereby making it possible to detect the rotational position of the rotational element (36) with accuracy. In addition, since the installation cannot be implemented at other positions than the position where the rotational element (36) and the rotation detection lever (49) correspond to each other, the occurrence of an erroneous installation of the rotational element (36) and the rotation detection lever (49) can be prevented.

In addition, in installing the rotational element (36) and the rotation detection lever (49), the larger toothed portion (36*c*) and the larger tooth groove (49*b*) are made capable of meshing with each other when the rotational element (36) is situated at one of the two positions (for example, at the unlocking position) and the rotation detection lever (49) is situated at a position which corresponds to the one of the two positions being taken by the rotational element (for example, at the unlocking position). According to this configuration, the installation of the rotational element (36) and the rotation detection lever (49) can be implemented in an easy and ensured fashion.

Furthermore, the rotational element (36) is made to constitute the key lever (36) that is capable of rotating to the locking position and the unlocking position in synchronism with the operation of the key cylinder provided on the exterior side of the door. According to this configuration, the locking and unlocking positions of the key lever (36) can be detected in an ensured fashion.

What is claimed is:

1. A rotational element position detector for a door latch assembly comprising:

a plurality of toothed portions provided on a rotational element being capable of moving between two different positions; and a plurality of toothed portions provided on a rotation detection lever of an electric switch, wherein one of the plurality of toothed portions of either of the rotational element and the rotation detection lever is made into a larger toothed portion which is larger in at least one of pitch or tooth height than the other toothed portions;

wherein one of a plurality of tooth grooves of the other of the rotational element and the rotation detection lever is made into a larger tooth groove that can be brought into mesh engagement with the larger toothed portion when the rotational element and the rotation detection lever are positioned so as to correspond to each other; and wherein the larger toothed portion and the larger tooth groove are capable of meshing with each other when the rotational element is situated at one of the two positions and the rotation detection lever is situated at a position which corresponds to the one of the two positions on the rotational element.

2. The rotational element position detector for a door latch assembly according to claim 1, wherein the rotational element is made to constitute a key lever that is capable of rotating to two positions of a locking position and an unlocking position in synchronism with the operation of a key cylinder provided on an exterior side of a door.

3. The rotational element position detector for a door latch assembly according to claim 1, wherein the plurality of toothed portions provided on the rotational element and the plurality of toothed portions provided on the rotation detection lever are made to mesh with each other, so that the rotation detection lever is made to rotate while following the rotation of the rotational element, whereby a rotational position of the rotational element can be detected.

4. The rotational element position detector for a door latch assembly according to claim 1, wherein the larger toothed portion is provided next to a toothed portion situated at a most distal end.

5. The rotational element position detector for a door latch assembly according to claim 1, wherein the larger tooth groove is brought into mesh engagement with the larger toothed portion when the rotational element and the rotation detection lever are both positioned at unlocking positions.

6. The rotational element position detector for a door latch assembly according to claim 1, wherein the larger tooth portion and the larger tooth groove mesh with each other only at proper positions and disable normal meshing engagement at other positions.

7. The rotational element position detector for a door latch assembly according to claim 1, wherein the plurality of toothed portions provided on the rotational element and the plurality of toothed portions provided on the rotation detection lever are coplanar.

8. A rotational element position detector for a door latch assembly comprising:

a plurality of toothed portions provided on a rotational element being capable of moving between two different positions; and a plurality of toothed portions provided on a rotation detection lever of an electric switch, wherein one of the plurality of toothed portions of either of the rotational element and the rotation detection lever is made into a larger toothed portion which is larger in at least one of pitch or tooth height than the other toothed portions;

wherein one of a plurality of tooth grooves of the other of the rotational element and the rotation detection lever is made into a larger tooth groove that can be brought into mesh engagement with the larger toothed portion when the rotational element and the rotation detection lever are positioned so as to correspond to each other; and wherein the larger toothed portion is provided next to a toothed portion which is situated at a most distal end.

* * * * *